D. WALD, O. C. BRITSCH & M. TAIGMAN.
MOTOR CONTROL APPARATUS.
APPLICATION FILED APR. 15, 1911.

1,000,864.

Patented Aug. 15, 1911.

5 SHEETS—SHEET 1.

WITNESSES:
E. H. Reichenbach
H. Whiting

INVENTOR
David Wald
Otto C. Britsch
Max Taigman
BY Munn & Co

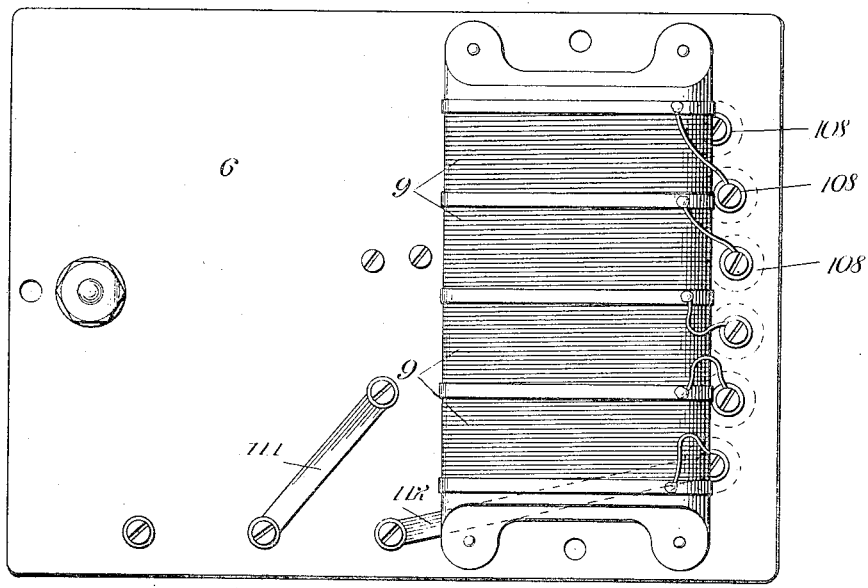
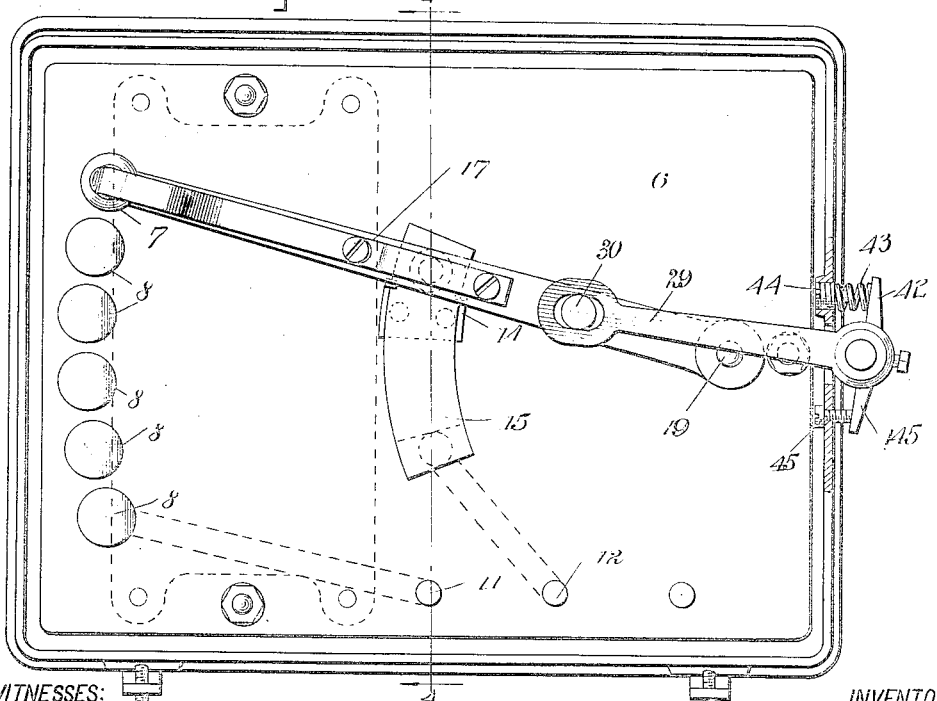

D. WALD, O. C. BRITSCH & M. TAIGMAN.
MOTOR CONTROL APPARATUS.
APPLICATION FILED APR. 15, 1911.
1,000,864.
Patented Aug. 15, 1911.
5 SHEETS—SHEET 3.
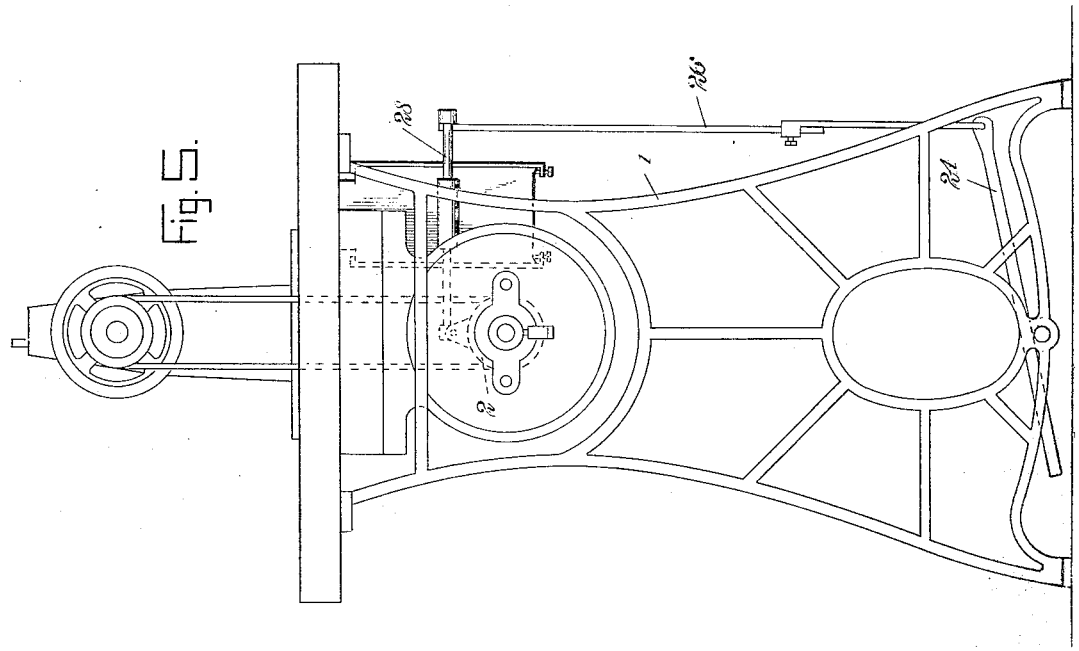
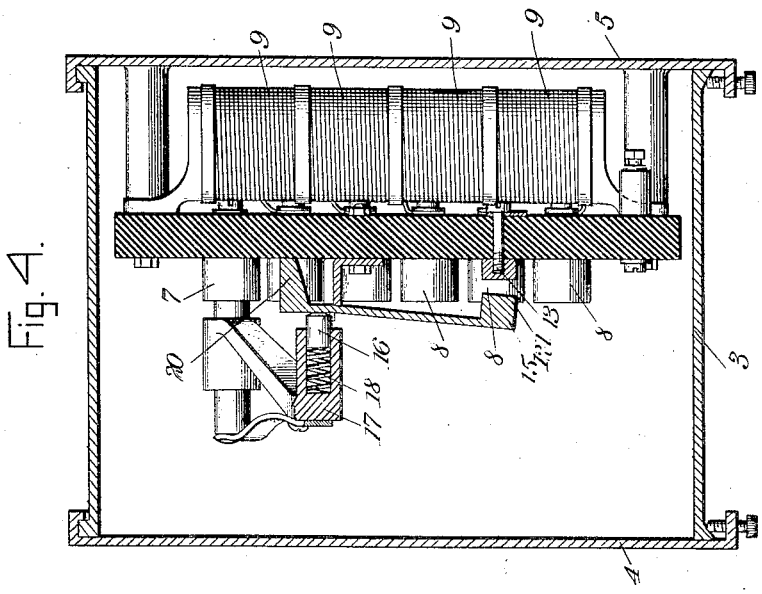

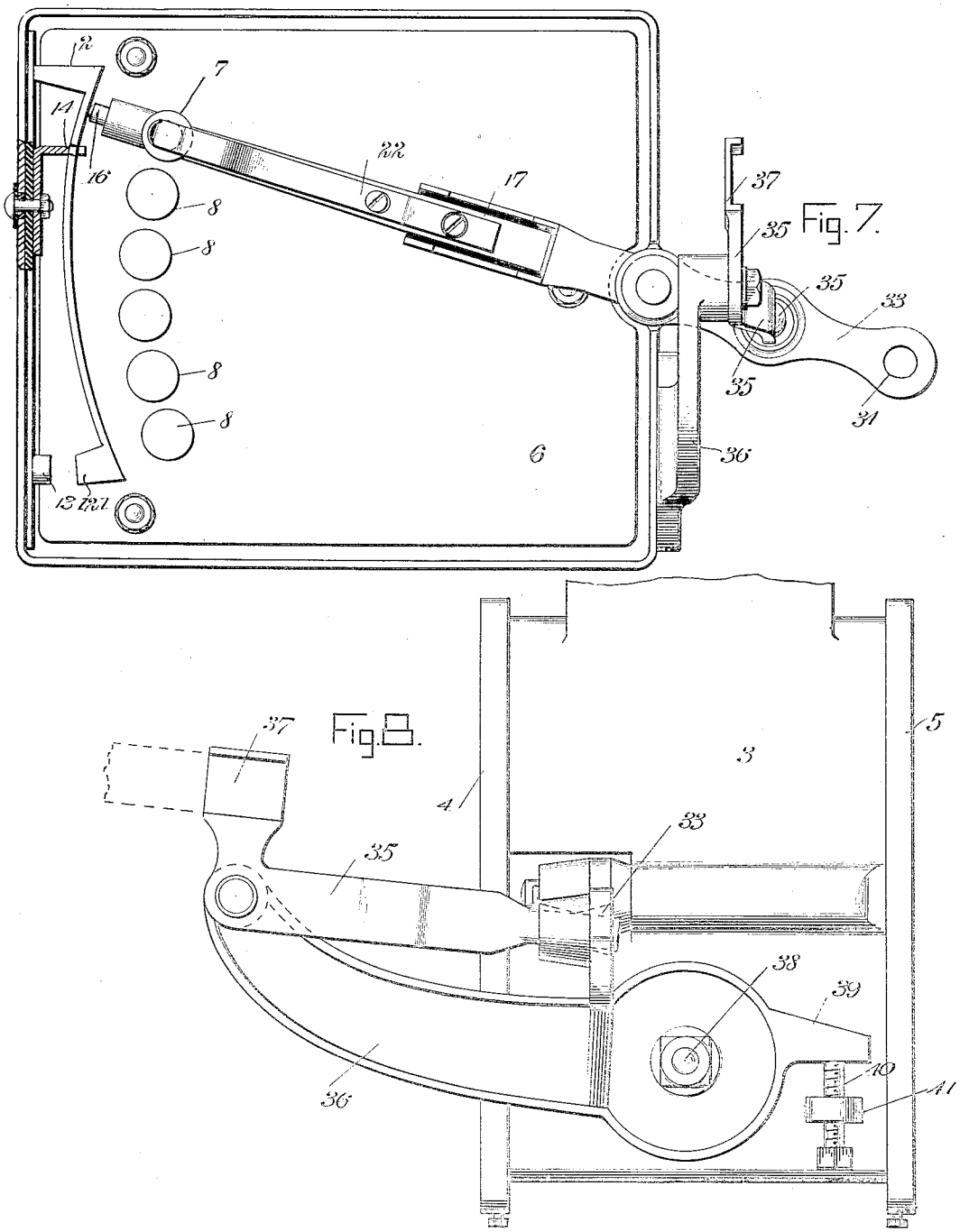

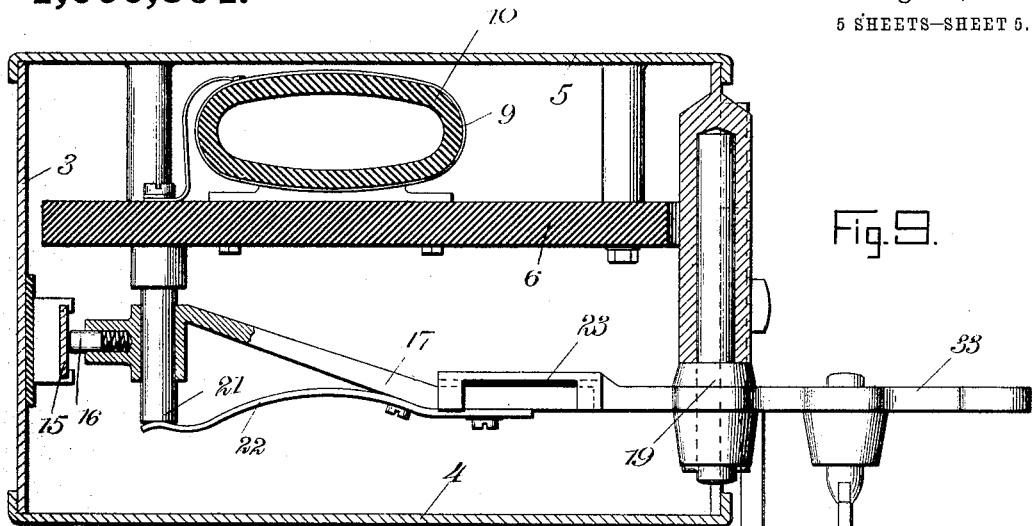
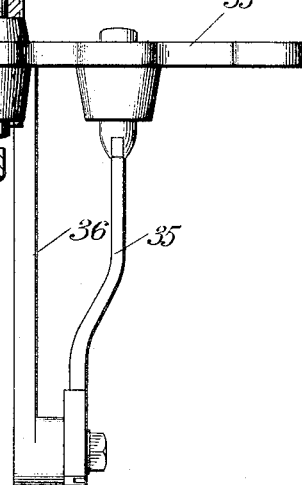
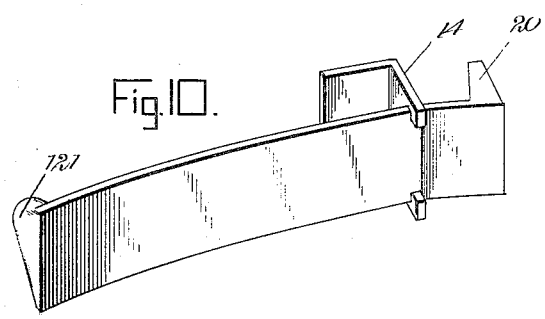

UNITED STATES PATENT OFFICE.

DAVID WALD, OTTO C. BRITSCH, AND MAX TAIGMAN, OF NEW YORK, N. Y.

MOTOR-CONTROL APPARATUS.

1,000,864.   Specification of Letters Patent.   Patented Aug. 15, 1911.

Application filed April 15, 1911.   Serial No. 621,222.

*To all whom it may concern:*

Be it known that we, DAVID WALD, OTTO C. BRITSCH, and MAX TAIGMAN, all citizens of the United States, and residents of the city of New York, borough of Manhattan, in the county and State of New York, have invented a new and Improved Motor-Control Apparatus, of which the following is a full, clear, and exact description.

This invention relates to a new and improved motor control, of a type which may be used in connection with any suitable mechanism, but is shown as specially adapted to be applied to a power sewing machine.

An object of this invention is to provide a motor control which will simultaneously throw the switch with the movement of the control arm, so as to prevent the sparking on the resistance contacts, thus increasing the life of the latter.

A further object of this invention is to provide a motor control which will be simple in construction, inexpensive to manufacture, strong, durable, readily accessible, and easily adjusted and repaired.

A still further object of this invention is to provide a motor control with means for simultaneously manipulating a brake to apply the same when the power is shut off, and with means for adjusting the support for the brake, whereby the wear in the latter can be taken up.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1:
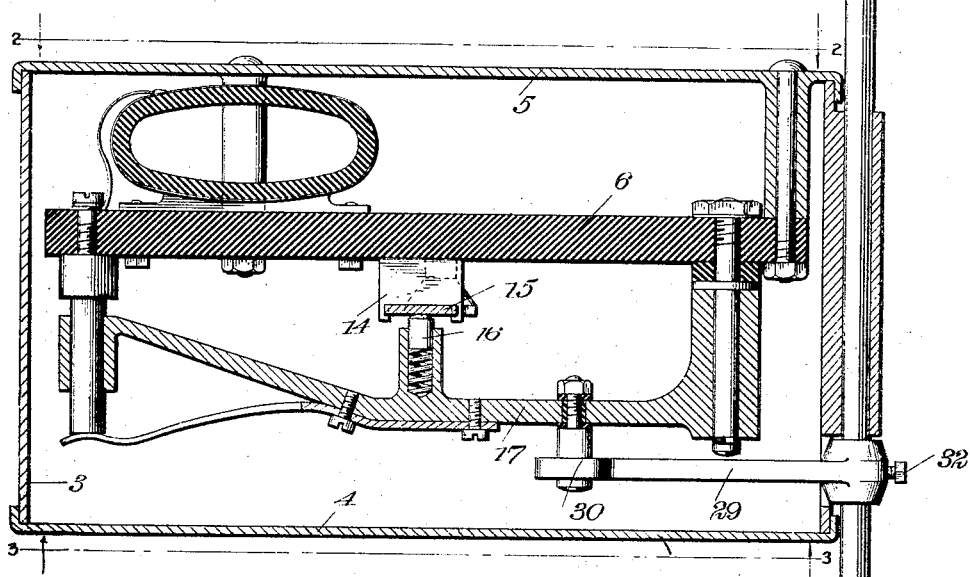
Figure 6:
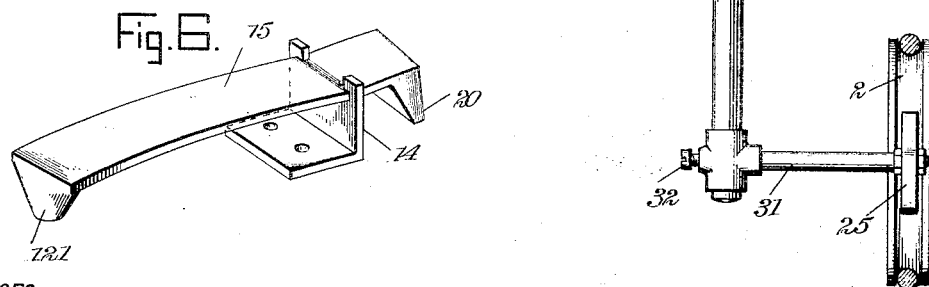

Figure 1 is a horizontal section; Fig. 2 is a view from the rear, with the back plate removed, as indicated at line 2—2 in Fig. 1; Fig. 3 is a view from the front, with the front plate removed, as indicated by the line 3—3 in Fig. 1; Fig. 4 is a transverse section on the line 4—4 of Fig. 3; Fig. 5 is a side view in elevation, indicating the location of the device on the sewing machine; Fig. 6 is a detail perspective view of the automatic switch bar; Fig. 7 is a front view, with the plate removed, partly in section, of a modified form; Fig. 8 is a detail view of the form shown in Fig. 7, showing the means for adjusting the brake support; Fig. 9 is a horizontal section of the form shown in Fig. 7; and Fig. 10 is a perspective view of the form of switch bar used in the modification shown in Figs. 7 to 9.

Referring more particularly to the separate parts of the device as embodied in the form shown in the drawings, 1 indicates a sewing machine frame, which may be of any suitable character, and which may be provided with a drive pulley 2, indicated in dotted lines in Fig. 5 and in full lines in Fig. 1, which is driven directly from the motor. For controlling the speed of this motor, there may be provided either one of two forms of controller, one form being shown in Figs. 1 to 6, and the other shown in Figs. 7 to 10. In each of these forms, the principle is the same, and similar parts will be referred to by the same numbers.

A casing 3 for the controller is provided, which may be of any suitable structure, and may be open at the front and back, which openings, however, may be closed by a front plate 4 and a back plate 5, secured thereto in any well known detachable manner. Secured in the casing 3 there is provided an insulating plate 6, which may be of any suitable material, such as slate. On the front of this plate there are provided a series of contacts 7 and 8, the contact 7 being dead, that is, connected to no source of electricity, and the contacts 8 are connected in series with a plurality of resistance coils 9, supported in any suitable manner in the casing 3, as, for example, the insulating ovals 10, detachably secured to the back of the insulating plate 6. Attention is drawn to the fact that the contacts 8 are connected to screws 108, which extend to the opposite side of the plate 5, where they are convenient to the end wires of the resistance coils, as will be seen by reference to Fig. 2, affording a structure which can be readily connected up without any danger of confusion. The last contact 8 in the series is connected, as indicated in dotted lines in Fig. 3 and in full lines in Fig. 2, by a strip 111 to a terminal 11, which may be connected to one side of any suitable source of electricity. Located adjacent the terminal 11 and on the plate 6 there is provided a similar terminal 12, which may be connected to the opposite side of the source of electricity, and is also connected to a working contact 13, as by a strip 112.

Movably mounted on the plate 6 in any suitable manner, as by being fulcrumed on a fulcrum plate 14, there is provided a switch bar 15, which is arcuate in form, so as to conform to the swinging motion of a contact 16 on a pivoted switch arm 17. The contact 16 is preferably held in yielding engagement with the switch bar 15 in any suitable manner, as by being slidingly mounted in a socket in the switch arm, and pressed outwardly by a spring 18. The pivot point of the switch bar in each form is indicated at 19. In the form illustrated in Figs. 1 to 6, the switch bar 15 is located directly on the insulating plate 6, and the contact 16 is located intermediate the ends of the switch arm 17. For this reason, the arc of the switch bar 15 is in a plane transverse to the movement of the switch bar. In the form shown in Figs. 7 to 10 inclusive, the switch bar 15 is located adjacent the end of the switch arm 17, and the contact 16 is located in the end of the switch arm 17, so as to bear on the switch bar. In this instance, the switch bar is curved or arcuate in a plane corresponding to the direction of its movement. In either instance, the bar is provided at one end with a stop lug 20, and at the other end with a contact lug 121. It will be noted that the contact lug 121 is located at a greater distance from the point of pivot or fulcrum than the stop lug 20. The reason for this is to provide sufficient surface on the bar 15 on the side of its pivot corresponding to the live contact 8 to permit the contact 16 to remain in engagement with the bar 15 while the arm 17 is in coöperative juxtaposition with each and every one of the live contacts 8. To connect the arm 17 with the contact 8, there is provided a contact plug 21, which is slidingly mounted in an opening in the arm 17, and normally held in engagement with the contacts 7 and 8 by means of a spring 22 on the arm 17. In the case of the arm 17 in the form shown in Figs. 7 to 10, the contact 16 being located outside of the contact plug 21, the circuit will be complete through these parts, and it is therefore necessary to break the arm at 23 and provide an insulating joint at this point. It will be noted by reference to Figs. 4 and 7 that in either case the switch bar 15 is of such a form that a movement to one side or the other of the pivoted fulcrum plate 14 will tilt the bar to that side. For this purpose, in the form shown in Figs. 1 to 6, the switch bar 15 is angular, the two sides of the angle meeting at the fulcrum plate, as will be seen by reference to Fig. 4. In the other form, the curved bar 15, instead of being in the form of a true arc of a circle, has its portions on opposite sides of the fulcrum plate of slightly different curvature, so that the bar will swing readily, to correspond with a movement to either side of the fulcrum plate. It will thus be seen that when the arm 17 is in such a position that the contact plug 21 will rest on the dead contact 7, the stop 20 will be in engagement with the insulating plate 6, and the contact lug 121 will be out of engagement with the contact 13, so that a complete circuit through the source of electricity will not only be broken at the point where the contact plug 21 is located, but also at the connection of the lug 121 to the contact 13. Inasmuch as this break is of the nature of a straight-parting break, and not a sliding break, as is the case in the plug 21 passing over the contacts 7 and 8, there will be little or no arcing, and at any rate, all of the arcing will take place between the contact 13 and the contact lug 121. The sliding contact, therefore, between the contact plug 21 and the contacts 7 and 8 will always remain in good condition and form a smooth sliding surface. In either form, the switch arm is adapted to be operated by the treadle of the sewing machine, indicated at 24. In either form, it is desirable that the brake, indicated at 25, should be simultaneously operated with the switch arm. In the form shown in Figs. 1 to 6, the treadle 24 is connected by a rod 26 to an arm 27 on a shaft 28. This shaft is provided with an arm 29, which is operatively connected to the switch arm 17 in any suitable manner, as by means of a pin-and-slot connection 30. The shaft is further provided with an arm 31, on which the brake 25 is secured in such a position that it will readily engage the power pulley 2. The arms 27, 29 and 31 are adjustably connected to the shaft 28, so that they can be adjusted to any particular position to take up wear in the brake 25, and to fix the parts in any predetermined relative position. For securing the arms in their adjusted position, there are provided set screws 32, which pass through screw-threaded openings in the hubs of the arms and engage the shaft 28. In the form shown in Figs. 7 to 10, the switch arm 17 is provided with an extension 33, having an opening 34, by means of which the link 26 can be connected to the arm 17, so that the arm can be operated from the treadle, and is also provided with a further opening intermediate its ends into which extends one end of a bell crank lever 35, which is pivotally mounted on a bracket 36. The arm 37 of this bell crank lever is adapted to support the brake and engage the power pulley, as in the case of the brake 25 in the form shown in Figs. 1 to 6. In order to take up the wear on the brake, in this instance, the bracket 36 is adjustably connected to the controller casing by being pivoted thereto by means of a bolt 38. A lug 39 on the bracket 36 engages an adjustable stop 40 in the nature of a screw entering a screw-threaded lug 41, whereby the bracket 36 may be held in any adjusted position.

It may be desirable, as indicated in the form shown in Figs. 1 to 6, to automatically cut off the switch by throwing the switch arm 17 to its dead point, when the pressure on the treadle 24 is removed. Here, the lever arm 29 is shown as being provided with an extension lug 42, which is engaged by a spring 43, adjustable to a plurality of tensions by means of a set screw 44. It will be seen that this spring 43 will tend to throw the switch arm to its cut-out position, the amount of which throw is limited by means of an adjustable stop 45, shown in the nature of an adjustable bolt mounted on the casing of the control and engaging an extension lug 145 located on the opposite side from the extension lug 42. The arrangement is such as not to interfere with the removal of the contents of the casings.

The utility of the device will be readily understood when taken in connection with the above description. When it is desired to start the sewing machine, the treadle 24 is pressed, so as to throw the switch arm 17 from the position shown in Figs. 3 and 7, where it overlies the short leverage portion of the switch bar 15. The instant the contact 16 passes beyond the fulcrum plate 14, the switch bar 15 will be tilted, so that the contact lug 121 will come in engagement with the contact 13 connected to the terminal 12. As this happens, the contact plug 21 will slide onto the first contact 8 in the series, making a complete circuit from the source of electricity through the terminal 12, the switch bar 15, the switch arm 17, the first contact 8, the series of resistance coils 9, and the terminal 11, back to the source of electricity. As the treadle is pressed more and more, the contact plug 21 will be shifted to the successive contacts 8, thus successively cutting out the resistance coils, and speeding up the motor. As the switch arm is thrown from its open or cut-out position to its closed or circuit-making position, the brake 25 will be released from engagement with the power pulley 2. When the pressure on the treadle is released, the switch arm will be automatically thrown off by the spring 43, and the brake-shoe 25 applied. Inasmuch as the switch bar 15 breaks the circuit, the arc will take place between the contacts 13 and the contact lug 121, thus saving the contacts 8. The wear on the brake-shoe can be taken up in either form by adjustment of the parts as previously described.

It will thus be seen that there is provided a simple and efficient device, which will be strong, durable, easily operated, non-arcing, and readily accessible for the purpose of cleaning and repairing.

While we have shown two embodiments of our invention, we do not wish to be limited to the specific details thereof, but desire to be protected in various changes, alterations and modifications which may come within the scope of the appended claims.

Having thus described our invention, we claim as new and desire to secure by Letters Patent:—

1. The combination with a plate, of a pair of terminals in said plate adapted to be connected to opposite sides of a source of electricity, a contact connected to one of said terminals, a contact connected to the other of said terminals, a switch arm adapted to bridge the gap between said contacts to make a complete circuit through said source of electricity, and a member interposed between said switch arm and one of said contacts and adapted to be brought into engagement with said last-mentioned contact when said switch arm is brought in connection with said first-mentioned contact, said switch-arm being adapted to operate said member, so as to make the break between said member and said last-mentioned contact.

2. The combination with a plate, of a series of contacts on said plate, a series of resistance coils connected in series with said contacts, a main contact on said plate, a bar pivotally mounted on said plate, a dead contact located in alinement with said first-mentioned series of contacts, and a switch arm normally in engagement with said bar and with one or the other of said series of contacts or said dead contact, said switch arm being movable to vary its position relative to said bar and said contacts and adapted, by its movement, to make and break the connection between said bar and said main contact.

3. The combination with a plate, of a pivotally-mounted switch arm adapted to swing in juxtaposition to said plate, a series of contacts arranged in the arc of a circle on said plate, said arc being struck from the pivot point of said switch arm, a contact plug on said switch arm, adapted to engage with any one of said contacts, one of said contacts being a dead contact, a series of resistance coils connected in series with the remainder of said contacts, a main contact, an arcuate switch bar arranged in juxtaposition to said switch arm and pivotally supported intermediate its ends, said bar having a contact lug adapted to engage said main contact, and a contact on said switch arm adapted to engage said switch bar, said switch bar being operated by said switch arm so as to break the engagement between said main contact and said contact lug when said switch arm is in juxtaposition to said dead contact.

4. The combination with a plate, of a pivotally-mounted switch arm adapted to swing in juxtaposition to said plate, a series of contacts arranged in the arc of a circle on said plate, said arc being struck from the pivot point of said switch arm, a contact plug on said switch arm, adapted to engage with any one of said contacts, one of said contacts being a dead contact, a series of resistance coils connected in series with the remainder of said contacts, a main contact, an arcuate switch bar arranged in juxtaposition to said switch arm and pivotally supported intermediate its ends, said bar having a contact lug adapted to engage said main contact, and a contact on said switch arm adapted to engage said switch bar, said switch bar being operated by said switch arm so as to break the engagement between said main contact and said contact lug when said switch arm is in juxtaposition to said dead contact, the pivot point of said bar being located at a distance from one end proportionate to the ratio of said dead contact to the number of live contacts in said first-mentioned series of contacts.

5. The combination with a plate, of an arm pivotally mounted in juxtaposition to said plate, a series of contacts on said plate, a plurality of resistance coils arranged in series with some of said contacts, one of said contacts being a dead contact, a switch bar pivotally fulcrumed intermediate its ends and having portions on the side facing said switch arm sloping nearer to the point of pivot of said switch arm, a main contact adapted to be engaged by said switch bar, and a contact on said switch arm adapted to engage said switch bar to complete electrical communications between said switch arm and said switch bar and also adapted to manipulate said switch bar through the swinging of said switch arm from one side to another of the pivotal fulcrum of said switch bar.

6. The combination with a plate, of a switch arm pivotally mounted in juxtaposition to said plate, a series of contacts arranged in the arc of a circle struck from the point of pivot of said switch arm, some of said contacts being live contacts, and one of said contacts being a dead contact, resistance coils interposed between said live contacts and connected in series therewith, an arcuate switch bar located in juxtaposition to said switch arm, a pivotal fulcrum for said switch bar, having its pivotal point of connection with said switch bar located in radial alinement with a line dividing said dead contact from said live contacts, a main master contact, said switch bar having a contact lug adapted to be brought into engagement with said main contact, and means for operating said switch bar from said switch arm, whereby said switch arm, in passing from said dead contact to said live contact, will make an engagement between said contact lug on said switch bar and said main contact.

7. The combination with a plate, of a series of contacts on said plate, a switch arm pivotally mounted in juxtaposition to said plate, a contact on said switch arm adapted to engage said first-mentioned contacts, said arm having a pair of extension lugs, one projecting from each side thereof, a stop engaging one of said lugs, and a spring engaging the other of said lugs, adapted to automatically shift said arm so that one of said lugs will engage with said stop.

8. The combination with a plate, of a series of contacts located in circular alinement on said plate, and a switch arm pivotally mounted in juxtaposition to said contacts, a pivotally-mounted arm operatively connected to said switch-arm and having a pair of extension lugs extending diametrically opposite to each other on opposite sides thereof, in juxtaposition to the point of pivot of said last-mentioned arm and adapted to control the extent of throw of said switch arm.

In testimony whereof we have signed our names to this specification in the presence of two subscribing witnesses.

DAVID WALD.
OTTO C. BRITSCH.
MAX TAIGMAN.

Witnesses:
H. WHITING,
PHILIP D. ROLLHAUS.